United States Patent
Avila Chillida

(10) Patent No.: US 10,955,178 B2
(45) Date of Patent: Mar. 23, 2021

(54) REGULATION METHOD FOR INVERTER COMPRESSORS IN REFRIGERATION FACILITIES

(71) Applicant: Vicente Avila Chillida, Valencia (ES)

(72) Inventor: Vicente Avila Chillida, Valencia (ES)

(*) Notice: Subject to any disclaimer, the term of this patent is extended or adjusted under 35 U.S.C. 154(b) by 37 days.

(21) Appl. No.: 15/936,816

(22) Filed: Mar. 27, 2018

(65) Prior Publication Data
US 2018/0283756 A1 Oct. 4, 2018

(30) Foreign Application Priority Data
Mar. 29, 2017 (ES) .................................. 201700309

(51) Int. Cl.
*F25B 49/02* (2006.01)
*F25B 49/00* (2006.01)
(Continued)

(52) U.S. Cl.
CPC .......... *F25B 49/025* (2013.01); *F25B 41/062* (2013.01); *F25B 49/005* (2013.01); *F25B 49/043* (2013.01); *F25B 2341/06* (2013.01); *F25B 2500/19* (2013.01); *F25B 2600/021* (2013.01); *F25B 2600/0251* (2013.01);
(Continued)

(58) Field of Classification Search
CPC .... F25B 41/062; F25B 49/005; F25B 49/025; F25B 49/043; F25B 2600/021; F25B 2600/0253; F25B 2600/2513
See application file for complete search history.

(56) References Cited

U.S. PATENT DOCUMENTS 5,209,076 A * 5/1993 Kauffman ............. F25B 49/005
62/126
5,570,585 A * 11/1996 Vaynberg .................. F25B 1/10
62/175
(Continued)

FOREIGN PATENT DOCUMENTS

AU 2013101085 A4 9/2013
EP 0146486 A2 6/1985
(Continued)

OTHER PUBLICATIONS

Garel Heos User Manual, 2014, pp. 1-52, Carel Industries, Italy.
(Continued)

*Primary Examiner* — Jonathan Bradford
(74) *Attorney, Agent, or Firm* — The Webb Law Firm

(57) ABSTRACT

A regulation method for an inverter compressor in a refrigeration system including establishing a working area via limit values for evaporation temperatures, condensation temperatures, compressor speeds, maximum compression ratio, and maximum superheat value, and measuring working values of the compressor in terms of evaporation temperature, condensation temperature, and compression ratio. If the compressor operates outside the established working area, the method includes modifying the working parameters of the compressor by acting on elements to be selected among the compressor speed, the opening angle of the expansion valve, and a combination thereof. If the compressor does not go back to the working area within a certain time, the method includes stopping operation of the compressor and triggering an alarm.

6 Claims, 5 Drawing Sheets

(51) Int. Cl.
*F25B 41/06* (2006.01)
*F25B 49/04* (2006.01)

(52) U.S. Cl.
CPC ... *F25B 2600/0253* (2013.01); *F25B 2600/19* (2013.01); *F25B 2600/21* (2013.01); *F25B 2600/2513* (2013.01); *F25B 2700/1931* (2013.01); *F25B 2700/21152* (2013.01); *F25B 2700/21174* (2013.01); *F25B 2700/21175* (2013.01); *Y02B 30/70* (2013.01)

(56) References Cited

U.S. PATENT DOCUMENTS

| | | | | |
|---|---|---|---|---|
| 5,857,348 | A * | 1/1999 | Conry | F04D 25/06 62/209 |
| 6,318,100 | B1 * | 11/2001 | Brendel | F25B 41/04 62/217 |
| 6,430,951 | B1 * | 8/2002 | Iritani | B60H 1/00021 62/229 |
| 2007/0028639 | A1 * | 2/2007 | Ikegami | B01D 53/265 62/271 |
| 2010/0170273 | A1 * | 7/2010 | Morimoto | B01D 53/261 62/176.6 |
| 2012/0010753 | A1 * | 1/2012 | Schuster | F25B 49/02 700/276 |
| 2013/0186118 | A1 * | 7/2013 | Ohs | F24F 3/153 62/94 |
| 2014/0174114 | A1 * | 6/2014 | Tamaki | F25B 45/00 62/129 |
| 2014/0260343 | A1 * | 9/2014 | Rite | F25B 49/022 62/56 |
| 2014/0343733 | A1 * | 11/2014 | Turner | F25B 49/025 700/276 |
| 2015/0075766 | A1 * | 3/2015 | Alston | F25B 49/02 165/287 |

FOREIGN PATENT DOCUMENTS

| | | |
|---|---|---|
| EP | 1039252 A2 | 9/2000 |
| EP | 2835602 A1 | 2/2015 |
| EP | 2876385 A2 | 5/2015 |
| EP | 2835602 A1 | 11/2015 |
| EP | 3388760 A1 | 10/2018 |
| ES | 2538306 A1 | 6/2015 |
| ES | 2558026 A1 | 2/2016 |
| JP | 6484055 A | 3/1989 |
| JP | 2011174702 A | 9/2001 |
| JP | 2011174702 A | 9/2011 |
| JP | 2013130160 A | 7/2013 |
| WO | 2009048566 A2 | 4/2009 |
| WO | 2009048578 A1 | 4/2009 |
| WO | 2018178485 A1 | 10/2018 |

OTHER PUBLICATIONS

Muvegi et al., "Integrated Control System With DC Inverter Technology for Heat Pumps", Carel Industries, 2011, pp. 215-223, Italy.
Maxon, "Superheat", Heatcraft, Jun. 1993, pp. 1-6, vol. 1:2, Tech Topics, Texas.
Notice of Opposition to EP 3388760; European Patent Office, dated Sep. 18, 2019.
Third Party Opposer's Ground for Opposition of EP 3388760, Sep. 12, 2019.

* cited by examiner

REGULATION METHOD FOR INVERTER COMPRESSORS IN REFRIGERATION FACILITIES

CROSS-REFERENCE TO RELATED APPLICATION

This application claims priority to Spanish Patent Application No. P201700309 filed Mar. 29, 2017, the disclosure of which is hereby incorporated in its entirety by reference.

BACKGROUND OF THE INVENTION

Field of the Invention

The present invention relates to controlling the refrigerating unit in refrigeration equipment by regulating the inverter compressor, both on an individual basis and for the system as a whole.

Description of Related Art

In most of the existing systems there are two situations that divide the current technology.

The first is a refrigeration system consisting of a central unit from which the entire refrigeration cycle is carried out. These systems have a series of centralised compressors and condensers that are of the appropriate size to be able to generate the amount of refrigeration needed to reach the working conditions in the specified area.

The other system consists of having a centralised area and the required individual refrigerating units arranged in the specific area in which a certain temperature is required. The problem with this model is that the cooling liquid flows through the entire circuit, thus causing loses in the system due to joins in the communications.

In both systems, the problem comes from the heat generated in the condensers, which heat the same area that is to be cooled.

Document ES2538306 relates to an industrial refrigeration system consisting of various independent refrigerating units aimed at both conservation and freezing, wherein each refrigerating unit is installed in a thermally and acoustically insulated piece of furniture. The refrigeration system comprises a single heat dissipation unit connected by a pipeline by means of a water ring from which branches extend to each of the refrigerating units. Each of the refrigerating units and the heat dissipation unit are provided with individual electronic control devices.

The refrigerating units comprise two compressors, which operate alternately and never simultaneously, such that it may continue refrigerating via one of the compressors even if the other compressor breaks down.

The individual electronic control devices of each of the components are connected to each other and to a control centre that receives information on the state of all the components of the installation and that is capable of detecting notifications and alarms.

In ES2538306, functionality has been considered as the main factor to be taken into account, while energy efficiency comes in second.

Document ES2558026 focuses on managing the energy efficiency of a refrigeration installation as described in prior document P201331679 by replacing the compressors of each of the refrigerating units with inverter compressors, thus eliminating compressor redundancy in the refrigeration equipment. The possibility of maintaining the inverter compressors redundant as a valid design alternative for situations in which the criticality of the system is valued more than its efficiency is thereby pushed to the background.

SUMMARY OF THE INVENTION

Embodiments of the present invention provide the management of the efficiency of a refrigerating unit with an inverter compressor or of the entire system through the programming of a control management system.

Embodiments of the present invention describe a method for regulating an inverter compressor of a refrigeration system comprising an expansion valve defined by an evaporation temperature $T_e$, a condensation temperature $T_c$, a compressor speed $v_c$ and a compression ratio $r_c$.

The method may include the following steps:

a) establishing a working area with predetermined values for:
   minimum and maximum evaporation temperatures $T_e$,
   minimum and maximum condensation temperatures $T_c$,
   minimum and maximum compressor speeds $v_c$,
   a maximum compression ratio $r_c$, which defines the relationship between a specific evaporation temperature $T_e$ and a specific condensation temperature $T_c$,
   a maximum superheat value, b) measuring the working values of the compressor in terms of:
   the evaporation temperature $T_e$,
   the condensation temperature $T_c$, and
   the compression ratio $r_c$, where,
if the compressor is operating on values outside the established working area, the method includes the additional step of:

c) modifying the working parameters of the compressor acting on elements to be selected between:
   the compressor speed $v_c$,
   the opening angle of the expansion valve,
   a combination of the above, such that, if the compressor does not go back to operating on values in the established working area within a certain time, the compressor stops operating and triggers an alarm.

In some embodiments, if working evaporation temperature $T_e$ of the compressor is lower than the established minimum evaporation temperature, step c) consists of decreasing the compressor speed $v_c$, to the established minimum. Furthermore, if the situation in which the working evaporation temperature $T_e$ of the compressor is lower than the established minimum evaporation temperature $T_e$, the general method comprises the following additional step:

d) closing the expansion valve until the predetermined maximum superheat value is reached.

In some embodiments, if the working condensation temperature $T_c$ of the compressor is lower than the established minimum condensation temperature $T_c$, step c) consists of closing opening the expansion valve.

In some embodiments, if the working evaporation temperature $T_e$ of the compressor is lower than the established minimum evaporation temperature, step c) consists of increasing the compressor speed $v_c$, to the established minimum. Furthermore, if the situation in which the working evaporation temperature $T_e$ of the compressor is lower than the established minimum evaporation temperature $T_e$, the general method comprises the following additional step:

d) closing the expansion valve until the predetermined maximum superheat value is reached.

In some embodiments, if the working evaporation temperature $T_e$ of the compressor is higher than the established maximum evaporation temperature $T_e$, step c) consists of increasing the compressor speed $v_c$ to the established maximum.

In some embodiments, if the working compression ratio $r_c$ of the compressor is lower than the established minimum compression ratio $r_c$, step c) consists of increasing the compressor speed $v_c$ to the established maximum.

Improvements affect the regulation of the efficiency and operation of the inverter compressor in the refrigerating unit, the management of the production of refrigerating power, and the management of the defrosting of the refrigerating unit. All of this without introducing new components into the system.

BRIEF DESCRIPTION OF THE FIGURES

As a complement to the description provided below, and for the purpose of helping to make the characteristics of the invention more readily understandable, in accordance with a preferred practical embodiment thereof, said description is accompanied by a set of figures, which by way of illustration and not limitation represent the following.

Below is a list of the references used in the figures:
1. Evaporator.
2. Fan.
3. Expansion valve.
4. Refrigerating unit.
5. Water ring.
6. Dissipater.
7. Compressor.
8. Heat exchanger.
15. Pressure valves.
16. Suction pressure probe.
17. Suction temperature probe.
18. Coolant tank.
19. Liquid temperature probe.
20. Gas/liquid heat exchanger.
21. Water temperature probes.
22. Oil exchanger.
23. Discharge pressure probe.
24. Discharge temperature probe.
25. Capillary liquid cooler.
26. Suction container.

DESCRIPTION OF THE INVENTION

Figure 2:
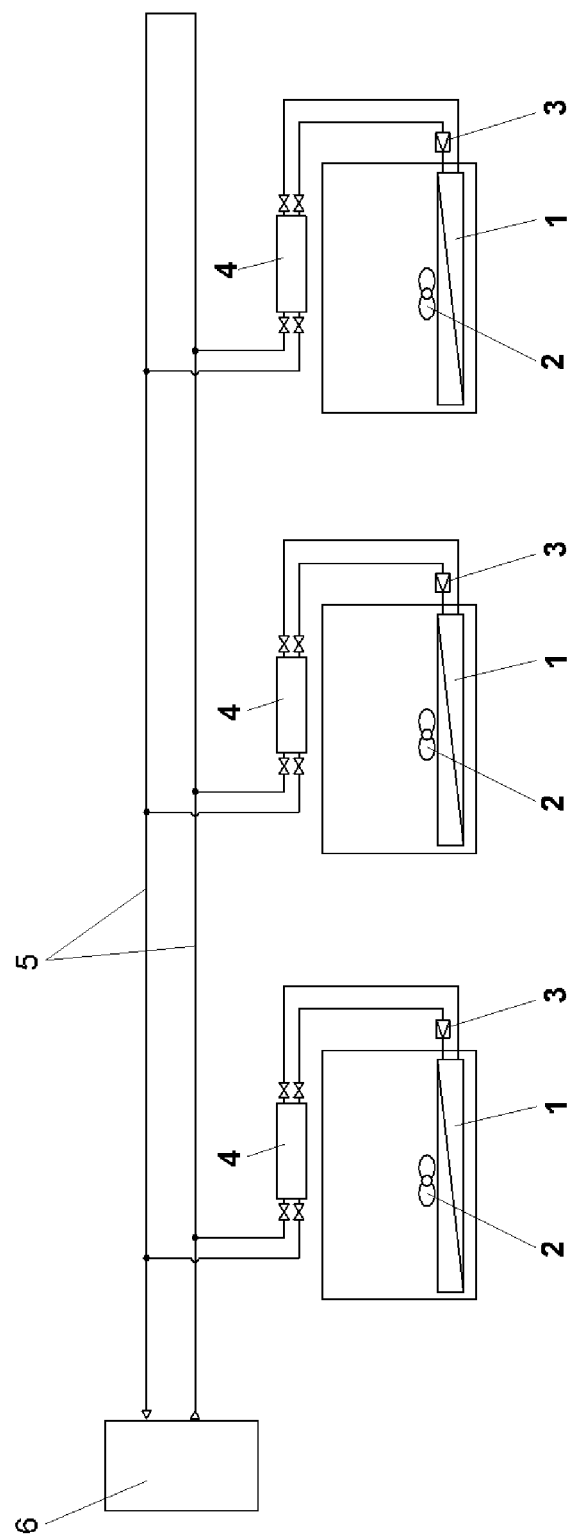
FIG. 2 represents a refrigerator and hydraulic diagram of the refrigeration system.

In a preferred embodiment and as shown in FIG. 2, the system includes a water ring (5) connected to a heat dissipater (6). Branches extend from the water ring (5) to the heat exchangers (8) of the condensers of the different refrigerating units (4) that make up the respective refrigeration equipment of the system, where the water receives the heat from the coolant. As for the coolant, the refrigerating units (4) are connected to the evaporators (1) through the expansion valves (3).

The system can use any of the substances known in the state of the art such as, for example, HFC, ammonia, propane, or even CO2, as coolant.

Figure 1:
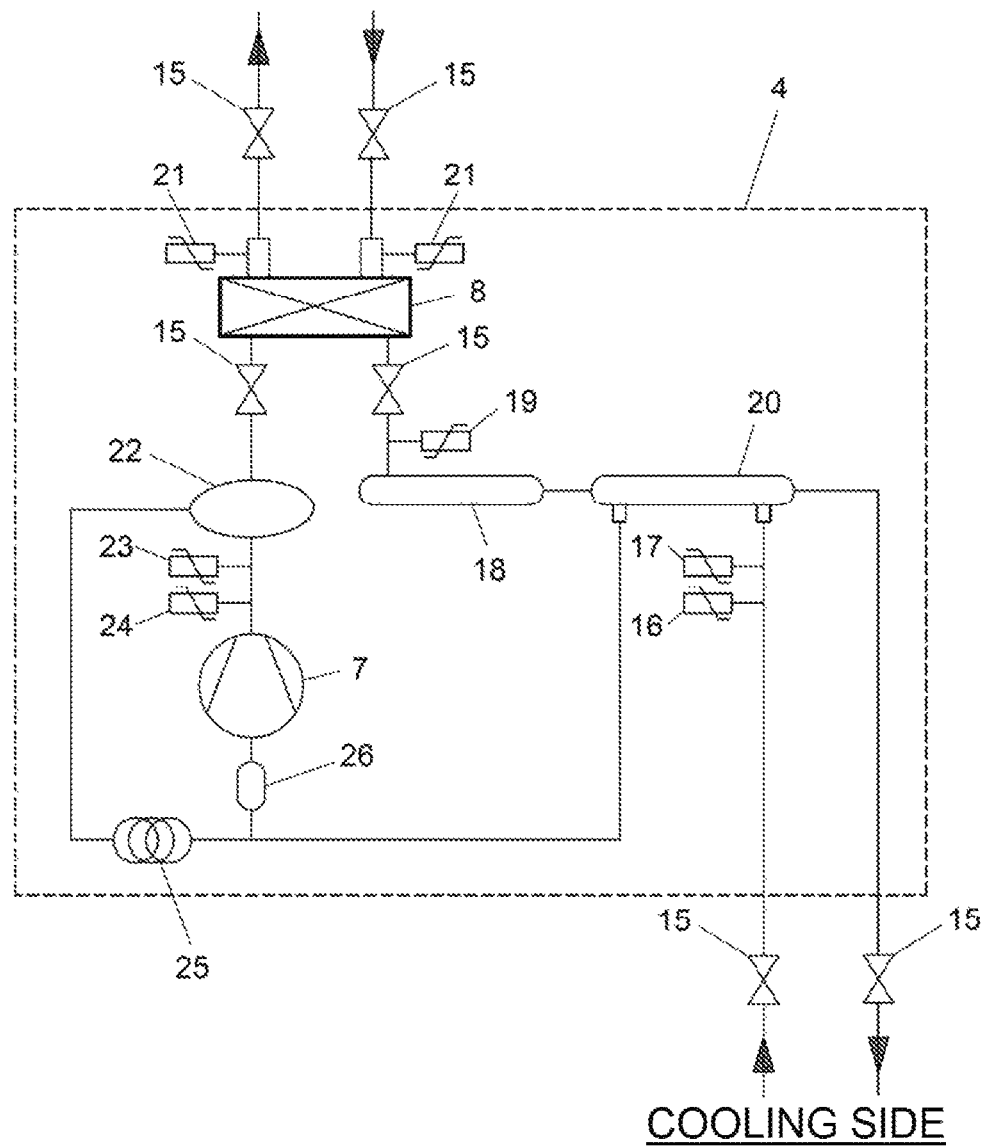
FIG. 1 represents a refrigerator and hydraulic diagram of a refrigerating unit.

FIG. 2 shows how the water from the closed ring (5) comes in and out of the heat exchanger (8) of each of the refrigerating units (4) controlled by both water temperature probes (21), as shown in FIG. 1.

FIG. 1 represents the refrigerator diagram of a refrigerating unit (4) using an inverter compressor (7). The inverter compressors (7) do not stop operating as the target temperatures are reached for the area to be cooled, as takes place with the traditional compressors, but rather the speed of the compressor (7) is reduced by a frequency converter as the target temperature is reached, such that the focus is on maintaining that target temperature by adapting the refrigerating power delivered as needed at all times. As the inverter compressor (7) does not start-up and shut-down, it does not suffer as much and the incorporation of a redundant system to prevent failures is not needed, leaving the system free to focus on energy efficiency.

It should be clarified that, for reasons of simplicity, when reference is made throughout the specification to a compressor, such references should be understood as references to an inverter compressor (7).

Thus, this figure shows how the coolant, which comes from the evaporator (1) and after passing through a suction pressure probe (16) and through a temperature probe (17), arrives at the gas/liquid heat exchanger (20) in order to be directed to the inverter compressor (7) and continue in order to enter in the heat exchanger (8). Similar to coming out of the evaporator (1), at the outlet of the inverter compressor (7), the coolant passes through a discharge pressure probe (23) and through a discharge temperature probe (24).

At the outlet of the inverter compressor (7), the coolant passes through an oil exchanger (22) that is responsible for collecting part of the oil included in the coolant and taking it to a capillary liquid cooler (25) in which it condenses.

Subsequently, the coolant leaves the heat exchanger (8) after having released the heat into the water ring (5) in order to move to the expansion valve (3) and the evaporator (1), both represented in FIG. 2.

Before entering the expansion valve (3), the coolant passes through a gas/liquid heat exchanger (20) incorporated for the purpose of providing greater efficiency to the system.

There may also be a coolant tank (18) in the refrigerating circuit such that the circuit is over-supplied and from which coolant is absorbed according the amounts required.

Embodiments of the circuit operation is as described below.

When the compressor (7) starts up, it increases the pressure and temperature of the coolant in gaseous phase, sending it to the heat exchanger (8) of the condenser.

In the heat exchanger (8) the coolant condenses passing energy to the water, reducing the simple temperature and enthalpy but maintaining the pressure constant.

The coolant leaves the heat exchanger (8) of the condenser in liquid phase at a condensing temperature situated between 35° C. and 50° C. and being sent to the evaporator (1) through the expansion valve (3).

In the expansion process, the liquid coolant reduces the pressure thereof until it reaches a certain evaporation temperature which is variable depending on the type of product to be cooled.

In the evaporator (1), the liquid coolant evaporates by capturing the energy of the product to be cooled, leaving the evaporator (1) in gaseous phase.

When the coolant in gaseous phase leaves the evaporator (1), it returns to the suction of the compressor (7) in order to repeat the process.

This process is repeated until the temperature of the product lowers to the desired set point.

Since the energy efficiency is improved, energy transfer takes place in a gas/liquid heat exchanger (20) between the coolant in liquid phase at the outlet of the heat exchanger (8) of the condenser and the coolant in gaseous phase when it returns from the evaporator (1) to the refrigerating unit (4) towards the inverter compressor (7).

The heat dissipated in the heat exchanger (8) of the condenser, which comes from the products, is released into a volume of water that is kept in circulation in a closed ring system (5) by means of water recirculation pumps that are located in the heat dissipater (6).

The system collects all the water from the different refrigerating units (4) that are operating, sending it to the water ring (5) by means of the water recirculation pumps until reaching the heat dissipater (6).

The recirculation pumps regulate the flow rate they produce, which may be necessary for the operation of the system, via a frequency converter controlled either by a water differential pressure probe that maintains the pressure difference between the suction and impulsion of the pump constant or by the modulating outlet that the control plate of the unit has in order to manage the flow of water.

In the heat dissipater (6), the water passes through a water-air heat exchanger, via which the heat captured is released in the end refrigerating units (4) into the outside air.

According to embodiments, the compressor (7) is the component of the system where most of the consumption of energy is done. Therefore, its correct management and control will guarantee the maximum savings in the consumption of electric power by the system and therefore greater energy efficiency.

By using the compressors (7) as mentioned above, the consumption of energy is regulated directly by means of frequency converters, which control compressor (7) speed depending on demand.

However, not only it is desirable to reach the target temperature of the area to be cooled, but it is also desirable to protect compressor (7) against out of range operations that could damage it. For this reason, not only the adjustment of the compressor (7) according to demand should be improved, but that its operation remains within the appropriate range should be also ensured, combining both functions.

According to embodiments, one of the limitations of the system is, in any case, based on the limitation of the minimum compressor (7) speed. According to embodiments, the speed has a direct influence on the correct refrigeration of the compressor (7) to the extent it limits the circulation of the coolant. In this way, regardless of the compressor (7) speed required by the temperature demands, even though that demand can be very low, the minimum compressor (7) speed may be limited to a minimum that should not be exceeded.

Figure 3:
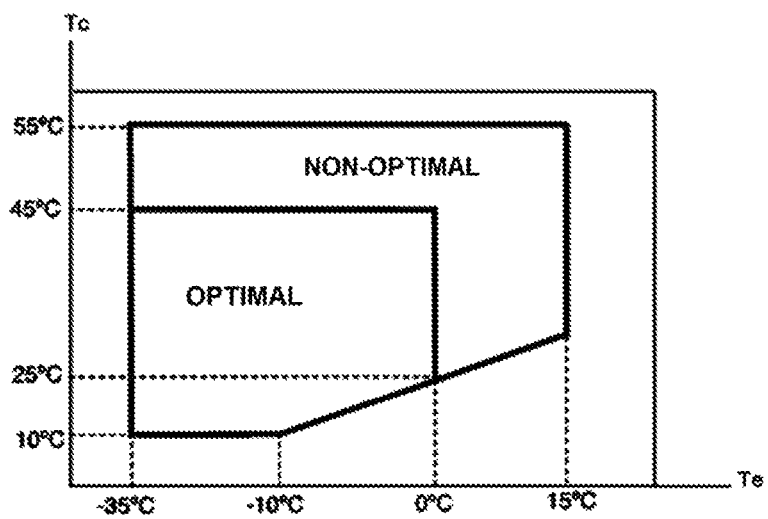
FIG. 3 represents an Evaporation temperature-Condensation temperature graph showing the optimal and non-optimal working areas of a compressor.

In some embodiments, this lower limit applicable to compressor speed (7) is given by the high-pressure and low-pressure working position in the graph, as reflected in FIG. 3, where the abscissa represents the evaporation temperature and the ordinate represents the condensation temperature.

The graph shows an OPTIMAL area where the compressor (7) should be operating. There is also a NON-OPTIMAL area, where the compressor (7) should be prevented from operating, and if it does operate therein, it should only do so for a short period of time.

Finally, there is a cropped area in the graph where the compressor (7) does not operate. To understand this area of the graph, the ideal gas law applied to a constant volume should be accounted for, together with the definition of compression ratio:

$$\frac{(P \times V)}{T} = cte \rightarrow \frac{P}{T} = cte$$

$$r_{comp} = \frac{P(\text{high})}{P(\text{low})} = \frac{P(\text{condensation})}{P(\text{evaporation})} \rightarrow r_{comp} = \frac{T(\text{evaporation})}{T(\text{condensation})}$$

Thus, it can be seen from the graph that when the compression ratio increases, the lower limit of the low pressure or, of the condensation temperature, should increase.

According to embodiments, this limitation is caused by high compression factors that imply greater heating of the compressor (7), which can damage the compressor (7) and reduce its useful life. For this reason, they should be avoided if possible.

In addition, there could be a situation where the compressor (7) is operating at high compression factors and at a low rotation speed when the area to be cooled has a temperature close to the target temperature. This could damage the compressor (7) due to overheating caused by the high compression ratio, on the one hand, and a lack of refrigeration due to the non-circulation of the coolant, on the other.

To avoid overheating, the volume of coolant in circulation may be increased, since this may refrigerate the compressor (7) and, above all, prevent it from exceeding the minimum levels.

In some embodiments, a control to be carried out is related to the compressor (7). Compressor (7) should be prevented from operating outside the OPTIMAL area indicated in the graph because it would be operating under undesirable pressure, temperature, speed or consumption conditions due to poor system performance and exposure to damage that could lead to failures in the compressor (7).

In some embodiments, the condensation and evaporation temperature values that define the areas of the graph marked as OPTIMAL and NON-OPTIMAL depend on the compressor (7) model in particular and may be specified by the manufacturer.

In some embodiments, the position in the graph in which a compressor (7) is operating may be due to the demand of certain conditions by the area to be cooled and can be affected by water and coolant temperatures, but may also be due to a failure in the refrigerating unit (4). For this reason, controls are established to determine if this situation is temporary or if, on the contrary, it can continue due to a failure in the refrigerating unit (4).

Thus, if the operation of the compressor (7) falls within an undesirable area, a time range may be established during which actions aimed at returning the compressor (7) to the OPTIMAL area will be performed.

In some embodiments, a certain time elapses during which the unit has tried to go back to its OPTIMAL working area but has not managed to leave the undesirable area, the system may consider that the refrigerating unit (4) is operating in an abnormal manner, it will stop operating and trigger an alarm.

Thus, depending on the position in which the compressor (7) is operating as regards the deviation from the OPTIMAL working area, certain corrective actions are adopted.

Figure 4:
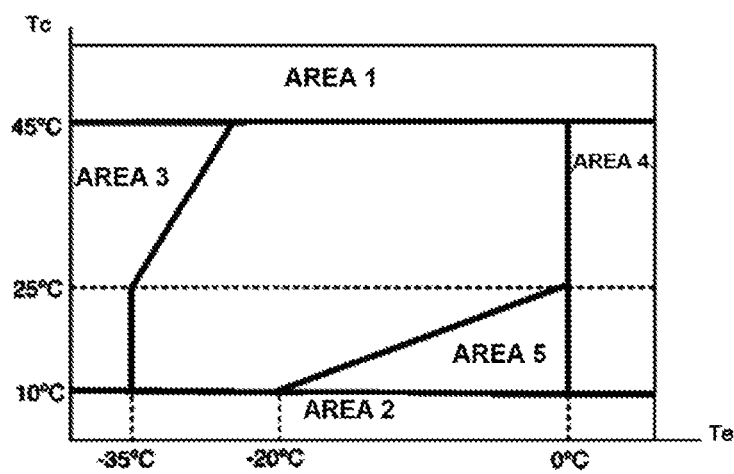
FIG. 4 represents the graph of FIG. 3 showing the danger working areas of a compressor.

The graph of FIG. 4 is based on the graph of FIG. 3 which represents the areas considered dangerous for the operation of the compressor (7) more precisely, differentiating them to determine the type of corrective action to be adopted in case the compressor (7) operates within any of these areas.

The effects of the compressor (7) operating within each of the marked areas and the corrective actions to be adopted to prevent the compressor (7) from operating in areas where it can be damaged are described below.

In the graph of FIG. 4, it should be taken into consideration that, based on the ideal gas law for a constant volume and as has been shown above, the pressure-temperature ratio should remain constant. This way, high-temperature or low-temperature areas imply high-pressure or low-pressure areas, respectively. In some embodiments, an increase in compressor (7) speed implies an increase in condensation pressure and a decrease in evaporation pressure, which would also imply an increase in the compression ratio.

In AREA 1 of FIG. 4, the condensation temperature and, therefore, the condensation pressure, are very high. To avoid triggering the high-pressure alarm, the condensation pressure should be reduced, for which the compressor (7) speed is reduced to the extent it is directly proportional, to the established lower limit.

If this lower limit of the minimum speed is reached and the compressor (7) is still within area 1, the electronic expansion valve (3) of the refrigeration equipment may be opened to try to reduce the high pressure and position the compressor in the OPTIMAL area. The opening of this valve (3) may be limited by the superheat value, which should be positive to ensure that the coolant liquid does not return to the compressor (7). The superheat value is the difference between the temperature at the evaporator outlet and the evaporation temperature at the evaporator inlet. The superheat value may be considered as the excess from the evaporation temperature, which provides a margin to ensure that the steam does not return to the liquid phase once again.

If these actions do not return the compressor (7) to the OPTIMAL area within a certain time, the compressor (7) may stop operating and triggers an alarm.

In AREA 2 of FIG. 4, the condensation temperature and, therefore, the condensation pressure, are very low. To avoid triggering the low-pressure alarm, the first action is to close the electronic expansion valve (3) of the refrigeration equipment to create an obstruction that increases the condensation pressure. This action limited by the existing routine in the expansion valve (3) and is conditional upon the maximum superheat value.

The operation of this routine is as described below. When the expansion valve (3) is closed, less coolant passes through the evaporator (1), due to which the superheat value may increase.

The expansion valve (3) remains closed until the maximum superheat value is reached, at which point it may be opened to avoid exceeding the maximum value.

This needs to be controlled since maintaining superheat values higher than the maximum superheat value can imply an excessive heating of the compressor given that the compressor (7) is cooled by the coolant passing through.

If, after closing the expansion valve (3), it is not possible to increase the condensation pressure within a certain period of time, the compressor (7) speed increases such that, when the condensation pressure increases, the expansion valve (3) is reopened to reach a certain condensation pressure and, consequently, a certain condensation temperature within the OPTIMAL area.

If these actions do not return the compressor (7) to the OPTIMAL area within a certain time, the compressor (7) may stop operating and may trigger an alarm.

In AREA 3 of FIG. 4, the evaporation temperature and, therefore, the evaporation pressure, are very low. Thus, the compressor (7) speed should be decreased to the established lower limit to increase the evaporation pressure and, therefore, the evaporation temperature.

If this action does not lead to an increase in the evaporation temperature, the expansion valve (3) may be opened with the positive superheat value as a limit. This way, by passing more coolant to the evaporator (1), the evaporation pressure, as well as the evaporation temperature, increase until the compressor (7) is found within the OPTIMAL operating area.

If these actions do not return the compressor (7) to the OPTIMAL area within a certain time, the compressor (7) may stop operating and may trigger an alarm.

In AREA 4 of FIG. 4, the evaporation temperature and, therefore, the evaporation pressure, are very high. Thus, the compressor (7) speed should be increased to decrease the evaporation pressure and, therefore, the evaporation temperature until the compressor is found within the OPTIMAL operating area.

If the compressor cannot return to the OPTIMAL area with this action, the expansion valve (3) may be closed, using the maximum superheat value as the limit to reduce the evaporation pressure and, therefore, the evaporation temperature.

If these actions do not return the compressor (7) to the OPTIMAL area within a certain time, the compressor (7) may stop operating and may trigger an alarm.

In AREA 5 of FIG. 4, the compression ratio is very low. Therefore, the compressor (7) speed should be increased to likewise increase the compression ratio. This way, the evaporation temperature decreases and the condensation temperature increases.

If this action does not return the compressor (7) to the OPTIMAL area within a certain time, the compressor (7) may stop operating and may trigger an alarm.

In some embodiments, control functions are carried out by electronic systems known in the state of the art.

Figure 5:
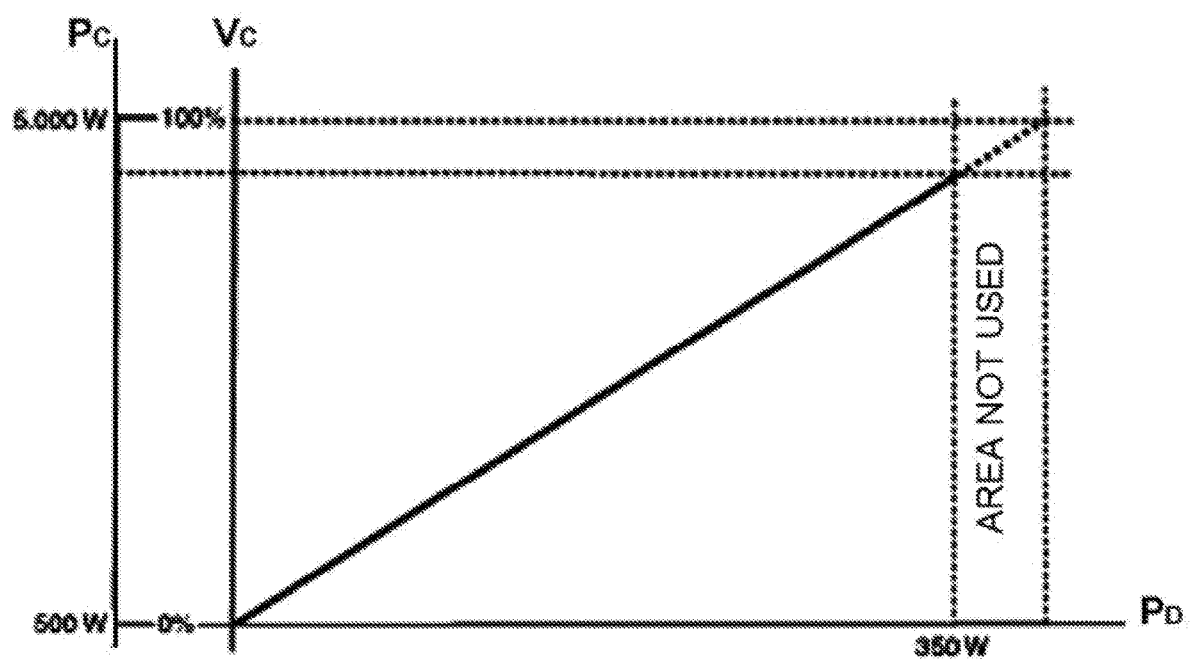
FIG. 5 represents a Discharge pressure versus compressor speed and compressor power graph, which are directly related.

Establishing the above safety routines, which may be activated in the event that the compressor (7) enters any of the danger operating areas 1 to 5 described above with the operating limits imposed by the operation of the compressor (7) and, based on the data of demand for refrigerating power, the refrigeration equipment may be configured to work at a point located in the OPTIMAL area of the graph shown in FIG. 4, based on the actual demand for refrigerating power being directly proportional to compressor (7) speed and, therefore, to compressor (7) power as reflected in FIG. 5 where the abscissa reflects demanded power $P_D$ and the ordinate reflects compressor power $P_c$ and compressor speed $V_c$.

Thus, the control system establishes a programmable parameter based on the data on the demand for refrigerating power increased by an adjustment factor to take into account the losses of the system, which may be due to the fouling and aging of the system.

It should be noted that, in some embodiments, the limits on compressor (7) speed may not be considered when the compressor (7) operates outside the OPTIMAL area established in FIG. 4, so as not to discriminate any of the tools to go back to the OPTIMAL area in the shortest possible time.

The working point in which the compressor (7) is found should be compensated between the target temperature or set point, which may be pre-established by the user, and the temperature identified by the temperature probe of the refrigerating unit (4), or the actual temperature of said refrigerating unit (4), for which a series of parameters should be established such as the dead area or temperature range as of the target temperature within which the refrigerating unit (4) does not adopt any action, and the differential, the temperature that marks the working point at which the compressor (7) should operate within the maximum limits allowed by reaching an operating speed that is 100% within the limit. The dead area may be established so that the compressor (7) does not have to change its operating conditions due to small and insignificant temperature variations. This value may be set at 0.5 degrees. The differential may be used as the maximum temperature increase permitted when a rapid decrease in temperature is required, and may be set to 1 degree.

In addition, the minimum operating limit of the compressor (7), already established as mentioned above, may be taken into account in a compressor operation curve (7). This may be the limit below which the compressor (7) begins to suffer and which should not be exceeded.

Figure 6:
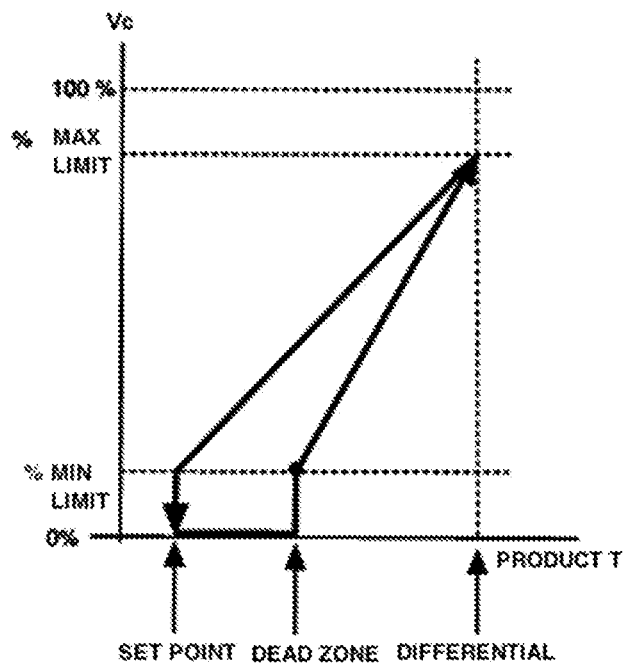
FIG. 6 represents a graph showing product temperature as a function of compressor speed.

This situation is represented in FIG. 6.

When the temperature of the product increases above the set point value increased with the dead area value, the compressor starts up at a low speed to compensate for the temperature increase. If the temperature continues to rise, the compressor increases its speed so that, if it reaches the differential, the compressor (7) reaches the maximum operating limit at 100% of the admissible value. When the temperature lowers, the compressor (7) speed decreases as well. The compressor (7) stops when it reaches the set point. It should be noted that the compressor (7) could also stop if it reaches the minimum limit before reaching the set point, without the circuit having to change much.

In addition to the positive and negative acceleration of the compressor (7), the speed at which that acceleration occurs, that is, the overspeed, is also taken into consideration.

It should be noted that the situation described above may be valid for refrigeration equipment that focuses on cooling a single area and also for several areas. In the latter case, the unit could focus on the variation in compressor (7) speed or in the opening and closing of the electronic expansion valve (3).

Figure 7:
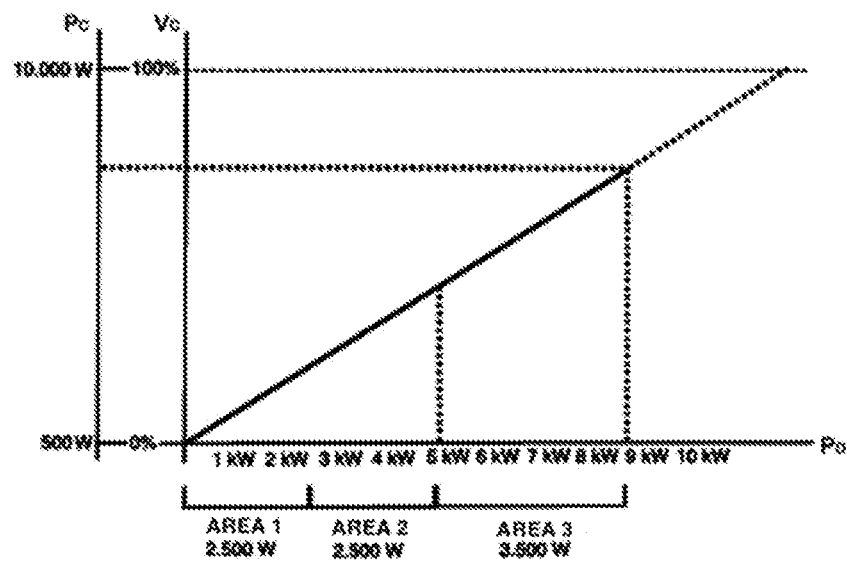
FIG. 7 represents the graph of FIG. 5 applied to several areas to be cooled by the same compressor.

In terms of compressor (7) speed, and as shown in FIG. 7 based on FIG. 5, the refrigerating power demanded may be limited by the sum of the different refrigerating powers demanded by each one of the areas to be cooled such that the total power demanded by the compressor (7) at each instant is the sum of the instantaneous powers demanded by each of the areas to be cooled connected to the refrigerating unit (4).

In some embodiments, the demand for refrigerating power of each of the areas to be cooled is based on the same criteria described above. Each of the parameters defined for the working conditions, i.e., set, differential and dead area, can be different in each of the refrigeration services to the extent that is the way in which the service will be provided under actual operating conditions.

In terms of the electronic expansion valve (3), variations in compressor (7) speed also influence the opening or closing of said valve (3), inasmuch as it controls the distribution of the volume of coolant circulating through the compressor (7) in the different areas to be cooled. It should also be noted that, due to the installation of the refrigeration pipeline, the coolant should be distributed correctly. Thus, depending on the demand for refrigerating power, the valve (3) is closed and, as demand increases, it opens.

When the compressor (7) stops operating, the expansion valves (3) may be closed. Prior to start-up, the expansion valve (3) is opened to a certain percentage that can be programmed as to value and time, regardless of the working curves and limitations described above.

The operation of the expansion valve (3) may be limited to the extent it focuses on maintaining a positive superheat value and due to the protection measures for the compressor (7) based on its working conditions.

In some embodiments, defrosting programming parameters can vary from one refrigerated area to another.

To avoid abnormal operations, when one of the services is in the process of defrosting, the expansion valve (3) should remain closed.

The present invention is not to be limited to the embodiments described herein. Other configurations may be made by a person skilled in the art in view of the present description.

The invention claimed is:

1. A regulation method for an inverter compressor in a refrigeration system comprising an expansion valve, the refrigeration system operation being defined by an evaporation temperature, a condensation temperature, a compressor speed and a compression ratio, the regulation method comprising the following steps:
   a) establishing a working area with predetermined values for:
      minimum and maximum evaporation temperatures,
      minimum and maximum condensation temperatures,
      minimum and maximum compressor speeds,
      a maximum compression ratio, which defines the relationship between an evaporation temperature and a condensation temperature,
      a maximum superheat value,
   b) measuring working values of the compressor according to the working values of:
      the evaporation temperature,
      the condensation temperature, and
      the compression ratio, where,
   in response to the compressor working values causing the refrigeration system to be operated at values which are outside the established working area, the method includes:
   c) modifying working parameters in the refrigeration system by acting on elements to be selected between:
      the compressor speed,
      the opening angle of the expansion valve, and
      a combination of the above,
   such that, in response to the compressor not returning to operating at working values causing the refrigeration system to be operated at values which are in the established working area within a certain time, the compressor stops operating and triggers an alarm, wherein in response to the working evaporation temperature in the refrigeration system being lower than the minimum evaporation temperature required by the established working area, step c) comprises decreasing the compressor speed until the minimum evaporation temperature required to establish the working area is reached, and wherein in response to the working evaporation temperature in the refrigeration system being lower than the established minimum evaporation temperature, further comprising:

d) closing the expansion valve until the predetermined maximum superheat value is reached.

2. The regulation method for an inverter compressor in a refrigeration system according to claim 1, wherein in response to the working condensation temperature of the refrigeration system being higher than the established maximum condensation temperature, step c) comprises lowering the compressor speed to an established minimum.

3. The regulation method for an inverter compressor in a refrigeration system according to claim 2, wherein in response to the working condensation temperature of the refrigeration system being higher than the established maximum condensation temperature, further comprising:

d) closing the expansion valve until the predetermined maximum superheat value is reached.

4. The regulation method for an inverter compressor in a refrigeration system according to claim 1, wherein in response to the working condensation temperature of the refrigeration system being lower than the established minimum condensation temperature, step c) comprises opening the expansion valve.

5. The regulation method for an inverter compressor in a refrigeration system according to claim 1, wherein in response to the working evaporation temperature of the refrigeration system being higher than the established maximum evaporation temperature, step c) comprises increasing the compressor speed to an established maximum.

6. The regulation method for an inverter compressor in a refrigeration system according to claim 1, wherein in response to the working compression ratio of the refrigeration system being lower than an established minimum compression ratio, step c) comprises increasing the compressor speed to an established maximum.

* * * * *

UNITED STATES PATENT AND TRADEMARK OFFICE
CERTIFICATE OF CORRECTION

PATENT NO. : 10,955,178 B2  
APPLICATION NO. : 15/936816  
DATED : March 23, 2021  
INVENTOR(S) : Vicente Avila Chillida Page 1 of 1

It is certified that error appears in the above-identified patent and that said Letters Patent is hereby corrected as shown below:

On the Title Page

Item (56), Column 2, Other Publications, Line 1, delete "Garel" and insert -- Carel --

Item (57), Column 2, Abstract, Line 5, delete "superheat" and insert -- reheat --

Signed and Sealed this  
Seventeenth Day of August, 2021

Drew Hirshfeld  
*Performing the Functions and Duties of the*  
*Under Secretary of Commerce for Intellectual Property and*  
*Director of the United States Patent and Trademark Office*